March 17, 1931. L. V. GASPERINI 1,796,782
SIGNAL DEVICE AND GARMENT PROTECTOR FOR AUTOMOBILE DRIVERS
Filed Jan. 29, 1930
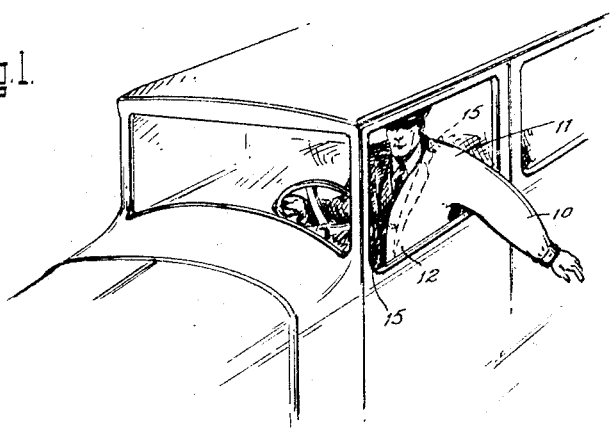
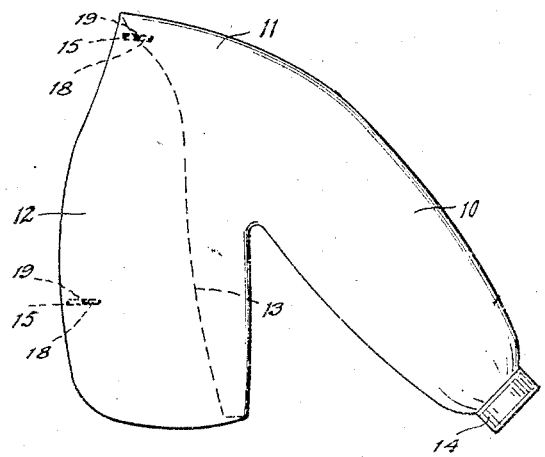
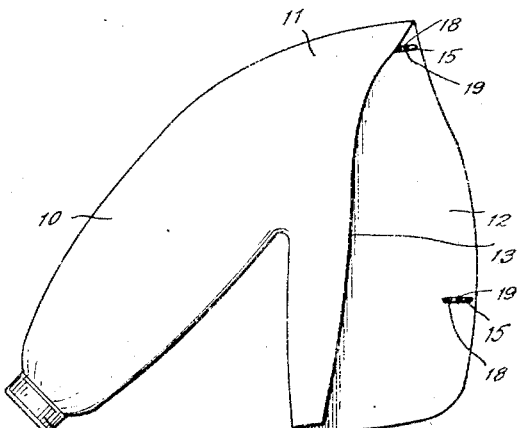
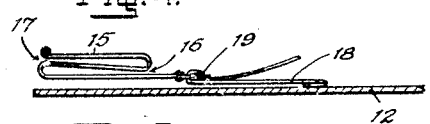
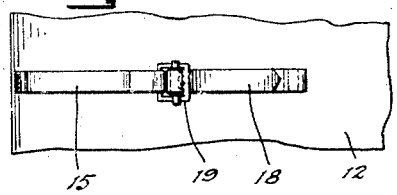
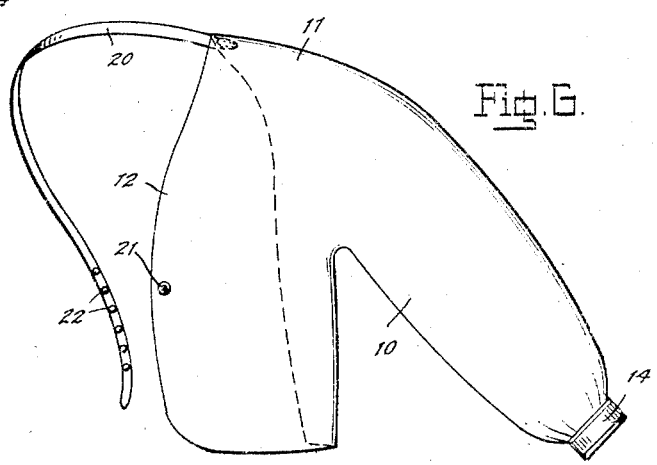
INVENTOR.
LEO V. GASPERINI.
BY
ATTORNEY.

Patented Mar. 17, 1931

1,796,782

UNITED STATES PATENT OFFICE

LEO V. GASPERINI, OF BRIDGEPORT, CONNECTICUT

SIGNAL DEVICE AND GARMENT PROTECTOR FOR AUTOMOBILE DRIVERS

Application filed January 29, 1930. Serial No. 424,224.

The present invention relates to a signal device and garment protector for automobile drivers, particularly for use in rainy weather and for night driving, and has for an object to provide a device which may be placed on the left arm and side of the driver in such relation that it will form a covering for the arm which will be readily seen in rainy weather or at night, when the driver sticks out his arm for signalling purposes, and in rainy weather will also effectually protect the clothes of the driver from getting wet. A further object is to provide a device of this character which may be readily put on and off by the driver without getting up from the seat, and will be compact so that it can be conveniently carried in the door pocket of the car and will therefore be quickly available at all times. Other objects are to provide a device which will be comfortable to wear, will not interfere with the operation of the car, and will be simple and inexpensive to manufacture.

With the above and other objects in view, embodiments of the invention are shown in the accompanying drawings and these embodiments will be hereinafter more fully described with reference thereto, and the invention will be finally pointed out in the claims.

In the drawings:—

Fig. 1 is a perspective view of an automobile showing the driver using the device, according to the present embodiment of the invention.

Fig. 2 is a front elevation of the device.

Fig. 3 is a rear elevation of the same.

Fig. 4 is a detail sectional view showing one of the clips employed for fastening it to the garment of the wearer.

Fig. 5 is a plan view of the clip as shown in Fig. 4.

Fig. 6 is a front elevation of a modified form of the invention in which a different fastening means is employed.

Similar reference characters indicate corresponding parts throughout the several figures of the drawings.

Referring to the drawings, the signal device and garment protector, according to the present embodiment of the invention, comprises a sleeve portion 10, a shoulder portion 11, and a chest protecting portion 12 extending downwardly from the shoulder portion and beneath the sleeve portion. The shoulder portion and the rear edge of the portion 12 preferably terminate at the rear along a line 13 which is clear of the back of the wearer where it engages the back of the seat, so that the device can be readily put on and off without getting up or moving forward in the seat. An elastic wrist portion 14 is provided at the end of the sleeve and is adapted to fit snugly about the wrist of the wearer.

The device is formed of a suitable waterproof material, as rubber or rubberized cloth, and the sleeve is of such size as to loosely and easily fit over the coat sleeve of the wearer. By making it in say two standard sizes, large and small, all sizes of people, both men and women, may be fitted, the loose fit of the sleeve and the elastic wrist portion taking care of practically all variations in size. The material from which the device is made is preferably of a color that may be readily seen at night, as for instance white or yellow.

The fastening means is adapted to readily secure the device to the coat, preferably to one or the other of the lapels, and for this purpose I provide a pair of spring clips 15, one being relatively high to support the shoulder and the other at the lower portion of the front edge to hold the device across the chest. As shown clearly in Figs. 4 and 5 the clip is provided with an inwardly directed clamping space 16 and an outwardly directed clamping space 17, so that it may be conveniently clamped to an edge of the coat directed either in one direction or the other, being hooked on the edge in one case and pushed on in the other. These clips are adjustably connected to the under side of the device by means of tapes 18 secured to the device and engaged in buckles 19 connected to the clips, the adjustment provided by this connection permitting the same to be fitted to different sized users and to one or the other lapels.

In Fig. 5 I have shown a modified form of fastening means consisting of a strap 20 secured at the upper edge of the device, and adapted to be carried around the neck of the wearer and adjustably secured by means of a snap fastener head 21 secured to the device and a series of snap fastener sockets 22 secured in the strap.

It will be understood that any suitable fastening means may be employed that will permit the device to be conveniently connected and disconnected and will securely retain it in place.

With the present device the automobile driver is enabled to signal with his arm in wet or rainy weather without getting his clothes wet, so that he will have no hesitancy in signalling when necessary, and the accidents which very often result in wet weather from the reluctance of the driver to get his clothes wet will be avoided to a great extent. Also the visibility of the device, due to its being made of light colored material, as white or yellow, will make its use very advantageous for night driving, the headlights of a following car picking up the signal clearly. As the device may be always available and quickly put on and off, without getting up from the seat, the driver will not be inconvenienced in using it whenever necessary, whereas he would very often not bother to use a raincoat.

The device will be particularly useful in the summer time, when coats are not ordinarily carried in cars, and when a raincoat is extremely uncomfortable.

I have illustrated and described preferred and satisfactory embodiments of the invention, but it will be obvious that changes may be made therein, within the spirit and scope thereof, as defined in the appended claims.

Having thus described my invention what I claim and desire to secure by Letters Patent is:—

1. As an article of manufacture, a signal device and garment protector for automobile drivers comprising a relatively voluminous sleeve portion of waterproof material, a body portion comprising a shoulder portion, a chest portion, and a side portion extending for a substantial distance below said sleeve portion, said body portion being defined at the front by an inner edge extending downwardly from the inner edge of the shoulder portion to a point inwardly and downwardly removed from the upper end of the under side of said sleeve portion, and a bottom edge substantially below said sleeve portion and continuous with the bottom edge of said side portion, and being defined at the back by the inner edge of said side portion connecting with the inner edge of said shoulder portion, whereby said body portion fully protects that part of the driver's garments exposed at the driving side of the automobile, and means for securing the same upon the driver.

2. As an article of manufacture, a signal device and garment protector for automobile drivers comprising a relatively voluminous sleeve portion of waterproof material, a body portion comprising a shoulder portion, a chest portion, and a side portion extending for a substantial distance below said sleeve portion, said body portion being defined at the front by an inner edge extending downwardly from the inner edge of the shoulder portion to a point inwardly and downwardly removed from the upper end of the under side of said sleeve portion, and a bottom edge substantially below said sleeve portion and continuous with the bottom edge of said side portion, whereby said body portion fully protects that part of the driver's garments exposed at the driving side of the automobile, and means for securing the same upon the driver, comprising a strap extending from said shoulder portion to the inner edge of said chest portion.

Signed at Bridgeport, county of Fairfield, and State of Connecticut, this 20th day of January, 1930.

LEO V. GASPERINI.